(12) United States Patent
Molloy et al.

(10) Patent No.: US 8,559,514 B2
(45) Date of Patent: Oct. 15, 2013

(54) EFFICIENT FETCHING FOR MOTION COMPENSATION VIDEO DECODING PROCESS

(75) Inventors: Stephen Molloy, Carlsbad, CA (US); Raghavendra C. Nagaraj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1311 days.

(21) Appl. No.: 11/495,270

(22) Filed: Jul. 27, 2006

(65) Prior Publication Data

US 2008/0025398 A1    Jan. 31, 2008

(51) Int. Cl.
H04N 7/12 (2006.01)

(52) U.S. Cl.
USPC .................................... 375/240.16

(58) Field of Classification Search
USPC .................................... 375/240.16
See application file for complete search history.

(56) References Cited

U.S. PATENT DOCUMENTS

| | | | |
|---|---|---|---|
| 5,697,054 A | 12/1997 | Andersson | |
| 5,884,174 A | 3/1999 | Nagarajan et al. | |
| 5,917,806 A | 6/1999 | Lin et al. | |
| 5,949,757 A | 9/1999 | Katoh et al. | |
| 6,134,216 A | 10/2000 | Gehi et al. | |
| 6,240,287 B1 | 5/2001 | Cheng et al. | |
| 6,324,172 B1 | 11/2001 | Pankaj | |
| 6,405,045 B1 | 6/2002 | Choi et al. | |
| 6,442,398 B1 | 8/2002 | Padovani et al. | |
| 6,456,850 B1 | 9/2002 | Kim et al. | |
| 6,563,810 B1 | 5/2003 | Corazza | |
| 6,707,792 B1 | 3/2004 | Volftsun et al. | |
| 6,785,546 B1 | 8/2004 | Djuric | |
| 6,944,449 B1 | 9/2005 | Gandhi et al. | |
| 6,996,178 B1 | 2/2006 | Zhang et al. | |
| 7,346,111 B2 * | 3/2008 | Winger et al. | 375/240.24 |
| 7,436,891 B2 | 10/2008 | Taunton | |
| 2002/0155852 A1 | 10/2002 | Bender | |
| 2002/0173316 A1 | 11/2002 | Jang et al. | |
| 2003/0003921 A1 | 1/2003 | Laakso | |
| 2003/0125068 A1 | 7/2003 | Lee et al. | |
| 2004/0165529 A1 | 8/2004 | Lee | |
| 2004/0190625 A1 * | 9/2004 | He et al. | 375/240.18 |

(Continued)

FOREIGN PATENT DOCUMENTS

JP    2005354673 A    12/2005
WO    2006029382       3/2006

OTHER PUBLICATIONS

Written Opinion—PCT/US07/074627—International Search Authority, European Patent Office—Apr. 16, 2008.

(Continued)

Primary Examiner — Richard Torrente
(74) Attorney, Agent, or Firm — Timothy F. Loomis; Brent Boyd

(57) ABSTRACT

Efficient memory fetching techniques are described that can improve data fetching during a motion compensation decoding process. The techniques propose several different memory fetching modes that may be very efficient in different scenarios of the motion compensation decoding process. A motion compensator may a particular memory fetch mode from a plurality of possible modes on a case-by-case basis for the memory fetches associated with a motion compensation decoding process of a macroblock. The techniques described herein may be particularly useful when fractional interpolation to sub-integer pixels is used in the inter-frame compression.

32 Claims, 11 Drawing Sheets

(56) References Cited

U.S. PATENT DOCUMENTS

2004/0209623 A1  10/2004  Sauter et al.
2005/0124369 A1   6/2005  Attar et al.
2005/0169378 A1*  8/2005  Kim et al. ............... 375/240.16
2005/0254581 A1* 11/2005  Iguchi et al. ............ 375/240.12

OTHER PUBLICATIONS

International Preliminary Report on Patentability—PCT/US07/074627—International Search Authority, European Patent Office—Oct. 20, 2008.

Wiegand, T. et al.: "Overview of the H.264/AVC video coding standard," IEEE Transactions on Circuits and Systems for Video Technology, IEEE Service Center, Piscataway, NJ, US, vol. 13, No. 7, Jul. 2003 pp. 560-576, XP011099249, ISSN: 1051-8215.

International Search Report, PCT/US2007/074627—International Search Authority, European Patent Office—Apr. 16, 2008.

S. Conversy and J-D. Fekete: "The svgl toolkit: enabling fast rendering of rich 2D graphics" Technical Report-Ecole Des Mines De Nantes, No. 02/01/info, 2002, pp. 1-11, XP002539626 France.

Chuan-Yung Tsai et al., "Bandwidth optimized motion compensation hardware design for H.264/AVC HDTV decoder", 48th Midwest Symp. On Circuits and Systems, Aug. 7, 2005, p. 1199-1202.

Wang, "Motion compensation memory access optimization strategies for H.264/AVC decoder", Proc. of Int. Conf. on Acoustics, Speech, and Signal Processing, Mar. 15, 2005, vol. V, p. V-97~V-100.

Zhu J., et al., "High performance synchronous DRAMs controller in H.264 HDTV decoder", Proc. of 7th Int. Conf. on Solid-State and Integrated Circuits Technology, Oct. 18, 2004, pp. 1621-1624.

* cited by examiner

EFFICIENT FETCHING FOR MOTION COMPENSATION VIDEO DECODING PROCESS

RELATED APPLICATIONS

The present Application for Patent is related to co-pending application Ser. No. 10/728,035 entitled Overload Detection in a Wireless Communication System, filed Dec. 3, 2003, and assigned to assignee hereof and hereby expressly incorporated by reference herein.

TECHNICAL FIELD

This disclosure relates to video processing, and more particularly, to memory fetching techniques for motion compensation decoding of a video sequence.

BACKGROUND

Digital video capabilities can be incorporated into a wide range of devices, including digital televisions, digital direct broadcast systems, wireless communication devices, portable digital assistants (PDAs), laptop computers, desktop computers, direct two-way communication devices (sometimes referred to as "walkie-talkies"), digital music and video devices, such as "iPods," and radiotelephones such as cellular, satellite or terrestrial-based radiotelephones. These and other video devices can provide significant improvements over conventional analog video systems in creating, modifying, transmitting, storing, and playing full motion video sequences.

A number of video processing and coding techniques have been established for communicating digital video sequences. The Moving Picture Experts Group (MPEG), for example, has developed a number of video coding standards including MPEG-1, MPEG-2 and MPEG-4. Other standards include the ITU H.263 standard and the emerging ITU H.264 standard, both developed by the International Telecommunications Union (ITU). The ITU H.264 standard is also set forth in MPEG-4, Part 10, entitled "Advanced Video Coding." A number of proprietary standards have also been developed by various companies, and new standards continue to emerge and evolve.

These and other video standards make use of data compression. For example, many video coding techniques utilize graphics and video compression algorithms designed to compress data by exploiting temporal or inter-frame correlation, to provide inter-frame compression. The inter-frame compression techniques exploit data redundancy across frames by converting pixel-based representations of some image frames to motion representations. In addition, the video compression techniques may also use similarities within image frames, referred to as spatial or intra-frame correlation, allowing for intra-frame compression.

Inter-frame compression is typically achieved via motion estimation and motion compensation coding techniques. In motion estimation encoding, a video block to be coded is compared to video blocks of a reference frame (such as the previously coded frame) in order to find a similar video block (referred to as a prediction video block). The prediction video block is identified by a motion vector, and can be used to code the current video block via motion compensation encoding.

The motion compensation encoding process includes creating a difference block indicative of the differences between the current video block to be coded and the prediction video block. In particular, motion compensation encoding usually refers to the act of fetching the best prediction block using a motion vector, and then subtracting the best prediction from an input block to generate a difference block (referred to as the residual or the residual video block). The residual video block typically includes substantially less data than the original video block to be coded. After motion compensation has created the residual, a series of additional steps can also be performed to further compress the data.

On the decoding side, motion compensation is typically the most bandwidth-intensive portion of the video decoding process. For motion compensation decoding, the residual video block is added back to the prediction video block that was used to code the residual. During this process, the prediction video blocks of the reference frame need to be fetched using the motion vectors that identify such video blocks in the reference frame. These memory fetches associated with motion compensation decoding are bandwidth-intensive, and can become even more inefficient as block sizes decrease and resolution improves.

SUMMARY

This disclosure describes efficient memory fetching techniques that can improve data fetching during a motion compensation decoding process. The techniques propose several different memory fetching modes that may be very efficient in different scenarios of the motion compensation decoding process. In some embodiments, a motion compensation unit selects a particular memory fetch mode from a plurality of possible modes on a case-by-case basis for the memory fetches associated with a motion compensation decoding process of a macroblock. The techniques described herein may be particularly useful when fractional interpolation to sub-integer pixels is used in the inter-frame compression. When such fractional interpolation is supported, e.g., according to ITU H.264 and MPEG-4, Part 10, many additional reference pixel value fetches may be needed to support the fractional interpolation.

In one embodiment, this disclosure provides a method comprising receiving motion vectors for a macroblock of video data, selecting a memory fetch mode from a plurality of possible modes for memory fetches associated with a motion compensation decoding process of the macroblock, and fetching data according to the selected memory fetch mode, wherein the fetched data includes pixel values identified by the motion vectors and additional pixel values needed for fractional interpolation.

In another embodiment, this disclosure provides a device comprising a memory that stores pixel data, and a motion compensator that receives motion vectors for a macroblock of video data, selects a memory fetch mode from a plurality of possible modes for memory fetches associated with a motion compensation decoding process of the macroblock, and fetches data from the memory according to the selected memory fetch mode, wherein the fetched data includes pixel values identified by the motion vectors and additional pixel values needed for fractional interpolation.

In another embodiment, this disclosure provides a decoder that receives motion vectors for a macroblock of video data, selects a memory fetch mode from a plurality of possible modes for memory fetches associated with a motion compensation decoding process of the macroblock, and fetches data according to the selected memory fetch mode, wherein the data includes pixel values identified by the motion vectors and additional pixel values needed for fractional interpolation.

In another embodiment, this disclosure provides a device comprising means for receiving motion vectors for a macroblock of video data, means for selecting a memory fetch mode from a plurality of possible modes for memory fetches associated with a motion compensation decoding process of the macroblock, and means for fetching data according to the selected memory fetch mode, wherein the data includes pixel values identified by the motion vectors and additional pixel values needed for fractional interpolation.

These and other techniques described herein may be implemented in a hardware, software, firmware, or any combination thereof. If implemented in software, the software may be executed in a digital signal processor (DSP) or other type of processor. The software that executes the techniques may be initially stored in a computer readable medium and loaded and executed in the processor to allow for video decoding that implements efficient memory loads during the motion compensation decoding process.

Accordingly, this disclosure also contemplates a computer-readable medium comprising executable instructions that when executed cause a decoder to receive motion vectors for a macroblock of video data, select a memory fetch mode from a plurality of possible modes for memory fetches associated with a motion compensation decoding process of the macroblock, and fetch data according to the selected memory fetch mode, wherein the data includes pixel values identified by the motion vectors and additional pixel values needed for fractional interpolation.

The details of one or more embodiments of this disclosure are set forth in the accompanying drawings and the description below. Other features and advantages of this disclosure will be apparent from the description and drawings, and from the claims.

DETAILED DESCRIPTION

This disclosure describes efficient memory fetching techniques that can improve data fetching during a motion compensation decoding process. Motion compensation is typically the most bandwidth-intensive portion of the video decoding process. For the motion compensation decoding process, a received residual video block is added back to the prediction video block that was used to code the residual video block. During this process, the prediction video blocks of a reference video frame need to be fetched using the motion vectors that identify such prediction video blocks in the reference frame relative to the coded residual video block.

Memory loads associated with the motion compensation decoding process consume a large amount memory bandwidth, and can become more inefficient as block sizes decrease and resolution improves. If fractional interpolation is performed, for example, additional pixel values that neighbor the prediction video blocks will need to be fetched during this motion compensation decoding process. In this case, when block sizes become small, the amount of additional data need for fractional interpolation can become overwhelming. At the same time, data overlap may result in several fetches of the same data, e.g., if one video block sub-partition is coded in a different direction relative to another sub-partition such that the sub-partitions overlap.

This disclosure proposes several different memory fetching modes that may be efficient in different scenarios of the motion compensation decoding process. By defining several fetching modes, and selecting the appropriate mode for a given scenario, the decoding process can be improved. For example, a motion compensation unit may select a particular memory fetch mode from a plurality of possible modes on a case-by-case basis for the memory fetches associated with motion compensation decoding of a macroblock. The techniques described in this disclosure may be particularly useful when fractional interpolation to sub-integer pixels are used in the inter-frame compression, as this can add significant amounts of data that needs to be fetched during the motion compensation decoding process. In some cases, the techniques described herein can reduce the bandwidth required for ITU H.264 motion compensation decoding by as much as approximately sixty-five percent.

Figure 1:
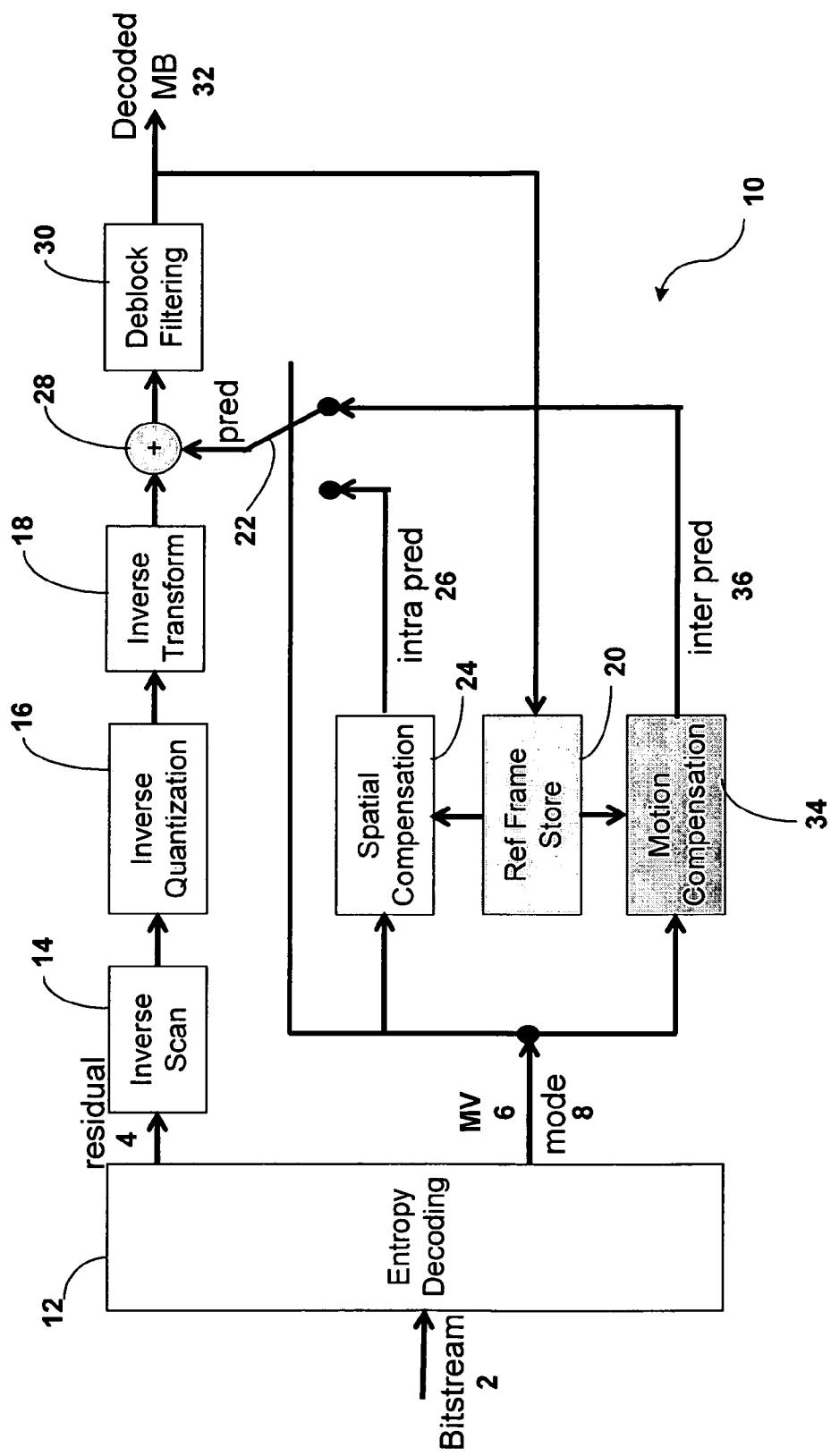
FIG. 1 is a block diagram illustrating an exemplary device that may implement the memory fetching techniques described herein.

FIG. 1 is a block diagram illustrating an exemplary decoder 10, which may be implemented in a video coding device. Decoder 10 may form part of a digital video device capable of receiving and decoding video data. In some cases, decoder 10 may also include encoding components and may form part of an integrated encoder/decoder (CODEC). Decoder 10 may implemented within devices such as digital televisions, digital direct broadcast systems, wireless communication devices, personal digital assistants (PDAs), laptop computers, digital music and video players, desktop computers, digital cameras, digital recording devices, network-enabled digital televisions, cellular or satellite radio telephones, or any other device with video capabilities.

Decoder 10 may be formed as part of a so-called "chip set" for a mobile radiotelephone, including a combination of hardware, software, firmware, and/or one or more microprocessors, digital signal processors (DSPs), application specific integrated circuits (ASICs), field programmable gate arrays (FPGAs), or various combinations thereof. Alternatively, decoder 10 may be implemented solely in software, in which case the software may be loaded on a processor to provide the decoding functionality described herein. In this case, the software that performs the decoder functionality, as described herein, may be originally stored on a computer-readable medium.

Decoder 10 may comply with one or more video coding standards, such as MPEG-4, ITU-T H.263, ITU-T H.264, or any other video coding standard. Decoder 10 may support inter-frame decoding techniques including a motion compensation decoding process, and may also support other techniques, such as entropy decoding and possibly intra-prediction decoding techniques (such as spatial compensation) used for intra-frame coding. The techniques described herein may be particularly applicable to the emerging ITU H.264 standard, which is also set forth in MPEG-4, Part 10, entitled "Advanced Video Coding."

As shown in FIG. 1, decoder 10 includes an entropy decoding unit 12 that receives an incoming bitstream 2. Entropy decoding generally refers to any lossless decompression process, such as variable length decoding or Huffman decoding. In particular, the incoming bitstream 2 is entropy decoded to generate a residual 4 and one or more motion vectors 6 associated with the residual. The entropy decoded bitstream may also provide mode information 8, which specifies how the residual 4 was decoded, e.g., using inter- or intra-prediction. In other words, mode information 8 indicates whether residual 4 was generated based on a prediction block within the current frame (intra) or a residual block within a different frame (inter). Mode information 8, in some cases, may be included with motion vector 6.

Residual 4 may be processed by an inverse scan unit 14, inverse quantization unit 16 and inverse transform unit 18. Inverse scanning converts a one-dimensional data structure of the residual into two-dimensional video blocks. Inverse quantization applies one or more quantization parameters to remove quantization from the residual. Inverse transformation refers to the process of removing any transformations such as discrete cosine transformation (DCT) on the residual video block.

As noted above, mode information 8 is generated in order to select an intra- or inter-mode in decoder 10. If residual 4 is intra-coded, then motion vectors 6 are used to identify prediction video blocks from the current video frame, which may be stored in memory 20 (also referred to as reference frame store 20). In this case, logic 22 may be set to an intra-prediction mode, which implements spatial compensation unit 24.

In intra-prediction mode, spatial compensation unit 24 uses motion vectors 6 to fetch one or more blocks of pixel data from memory 20. Spatial compensation unit 24 outputs an intra-prediction video block 26. The intra-prediction video block is then added with residual 4 (following the inverse scanning, inverse quantization and inverse transforming) using adder 28. If desired, deblock filtering may also be performed by a deblock filtering unit 30, typically for the luminance values or blocks of a given macroblock and not for the chrominance values. The output of deblock filtering unit is a decoded macroblock 32, which may also be stored back into memory 20 as part of the current frame, which can be used in subsequent iterations of the decoding process.

If residual 4 is inter-coded, then motion vectors 6 are used to identify one or more prediction video blocks from a different video frame, which may be stored in memory 20. The inter-prediction may be uni-directional, in which case every motion vector typically points to video blocks of a previous frame, or bi-directional, in which case the motion vectors may point to video blocks of previous or subsequent frames. For simplicity, however, the techniques of this disclosure are generally described from the perspective of uni-directional prediction in which the motion vectors point to video blocks of a previous frame.

For the inter-coding mode, logic 22 may be set to inter-prediction, which implements motion compensation unit 34 (also referred to as a motion compensator). Motion compensation unit 34 uses motion vectors 6 to fetch one or more blocks of pixel data from memory 20. Motion compensation unit 34 outputs an inter-prediction video block 36. The inter-prediction video block 36 is then added with residual 4 (following the inverse scanning, inverse quantization and inverse transforming) using adder 28. If desired, deblock filtering may also be performed by a deblock filtering unit 30. Again, decoded macroblock 32 may be output by decoder 10 and may also be stored back into memory 20 as part of the current frame, which can be used in subsequent iterations of the decoding process.

As noted above, motion compensation is typically the most bandwidth-intensive portion of the video decoding process. In particular, the memory loads and fetches associated with the motion compensation decoding process are very bandwidth-intensive, and can become even more inefficient as block sizes decrease and resolution improves. Furthermore, if fractional interpolation is performed, additional pixel values that neighbor the prediction video blocks will need to be fetched during this motion compensation decoding process.

An inter-predicted macroblock can be formed from integer multiple of variable sized non-overlapping blocks called partitions and sub-partitions. MPEG-4 and ITU-H.263 support either one 16×16 macroblock or four 8×8 macroblock partition shapes. ITU H.264 and MPEG-4, Part 10 "advanced intra coding" supports one 16×16 macroblock, two 16×8 partitions, two 8×16 partitions or four 8×8 block partitions. Furthermore, ITU H.264 and MPEG-4, Part 10 further supports each 8×8 partition to be sub-divided into one 8×8 sub-partition, two 8×4 sub-partitions, two 4×8 sub-partitions or four 4×4 sub-partitions.

Figure 2:
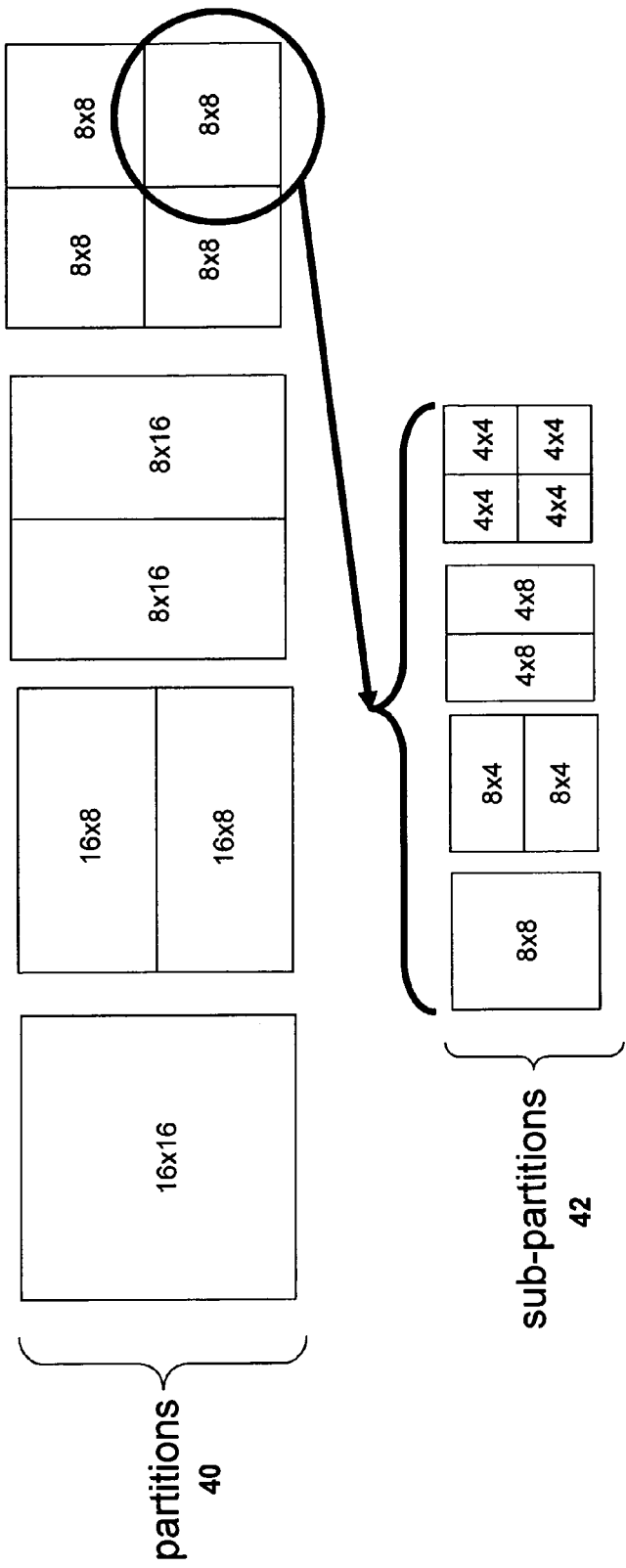
FIG. 2 is a conceptual diagram illustrating the concepts of macroblocks, partitions and sub-partitions.

The concept of macroblocks, partitions and sub-partitions are generally illustrated in the conceptual diagram of FIG. 2. Partition 40 may comprise a full 16 by 16 macroblock or the macroblock may be divided into two 16×8 partitions, two 8×16 partitions or four 8×8block partitions. Furthermore, the 8×8 block partitions may be further divided into sub-partitions 42, i.e., one 8×8 sub-partition, two 8×4 sub-partitions, two 4×8 sub-partitions or four 4×4 sub-partitions. As can be seen in FIG. 2, the 8×8 blocks are sometimes referred to as partitions and sometimes as sub-partitions. Of course, the techniques of this disclose may also apply to macroblocks, partitions and sub-partitions defined according to other standards or video block sizes.

Each macroblock may include partitions and/or sub-partitions for chrominance and luminance values, and in some cases the blocks for chrominance and luminance may differ due to different sampling rates of these different pixel components. In other words, the macroblocks may comprise one of more blocks of chrominance values and one or more blocks of luminance values. The following discussion, however, generally focuses on macroblocks as block of pixels for simplicity. It is generally understood that these pixel blocks could be chrominance blocks, luminance blocks, and combinations thereof. Furthermore, the pixels of a given macroblock may be represented in more than one block of video data, e.g., one or more blocks of chrominance values and one or more blocks of luminance values.

Each partition or sub-partition has its own motion vector that describes which reference frame to use, and the location in the reference frame from which to gather the predictor partition or sub-partition. Furthermore, many video coding standards support a half-pixel precision of these motion vectors. In this case, the half-pixels can be generated through bi-linear interpolation of the neighboring integer-pixels. For example, motion compensator 34 may generate such half-pixel inter values as needed.

Some standards (such as ITU H.264 and MPEG-4, part 10) further support quarter-pixel precision of the motion vectors. In this case, the half-pixels can be generated by filtering the neighboring integer-pixels in horizontal and vertical directions using a 6-tap filter. The quarter-pixels can then be generated through bi-linear interpolation of the neighboring half-pixels. Such filtering and interpolation can be implemented in motion compensator 34.

Unfortunately, for such quarter-pixel precision according to ITU H.264 and MPEG-4, part 10, it is necessary to fetch additional data for every given video block to be filtered. This means that for any given macroblock, partition or sub-partition, motion compensator 34 must fetch not only the given video block from memory 20, but also the neighboring video blocks needed for interpolation of the edge-most pixels of that given video block, i.e., the pixels closest to the edge of the video block. In these cases, when partitions and sub-partitions become smaller, the amount of data that needs to be fetched during the motion compensation process can become extensive.

Figure 3:
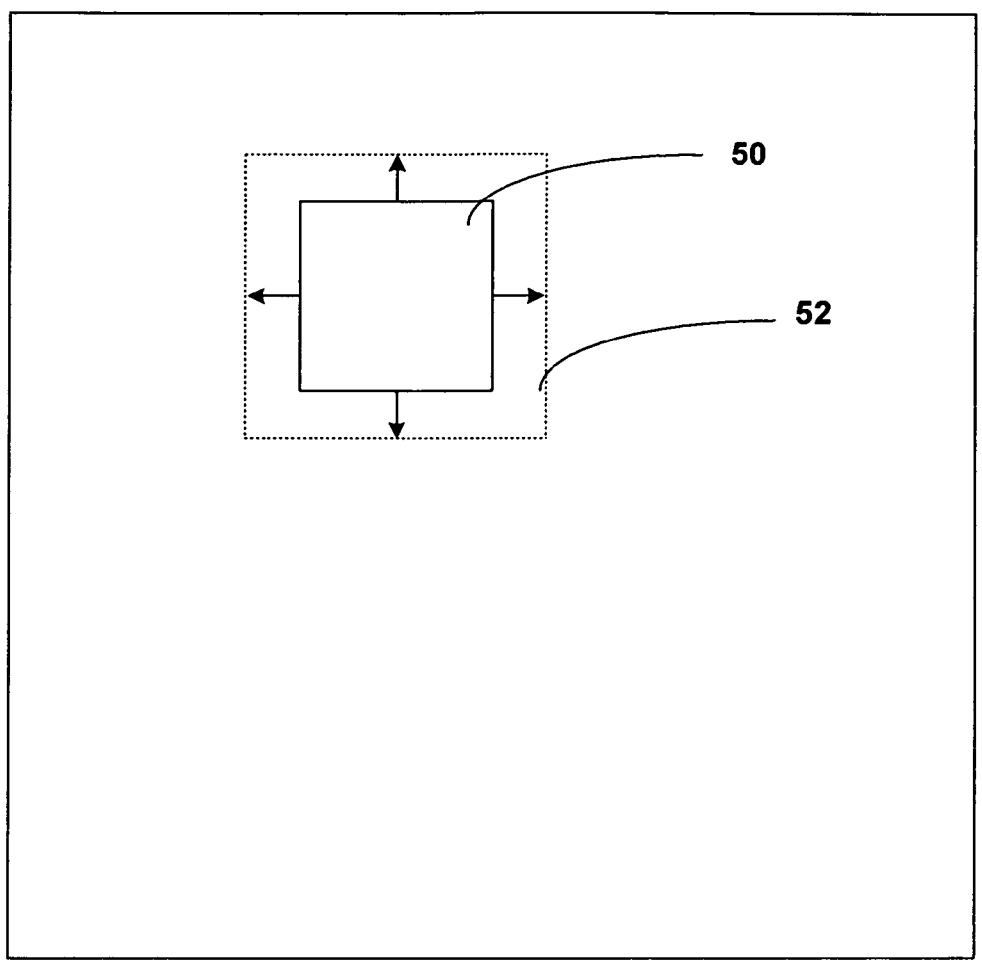
FIG. 3 is a conceptual diagram illustrating a macroblock partition or sub-partition of video data surrounded by additional pixels needed for fractional interpolation.

FIG. 3 is a conceptual diagram illustrating a macroblock partition or sub-partition of video data 50 surrounded by additional pixels 52 needed for fractional interpolation. It should be appreciated that the inclusion of more sub-partitions can result in more resolution, but require significantly more data fetching due to the additional pixels 52 need for fractional interpolation about a given partition or sub-partition. Again, the additional pixels (e.g., according to ITU H.264 and MPEG-4, Part 10) are due to the need to apply a six-tap filter for half-pixel interpolation. Thus, the pixels that are adjacent the edge-most pixels of a given video block are needed in this context to allow for the interpolation to sub-pixel resolution.

In order to accommodate the fractional-pixel motion compensation, an area larger than the partition (or sub-partition) size, i.e., additional pixels 52, needs to be fetched from the reference frame. In order to accommodate quarter-pixel motion compensation in compliance with ITU H.264, for a 16×8 partition, a (16+5)×(8+5) area (113% overhead) from the reference frame is needed:

((16+5)×(8+5)−(16×8))/(16×8)=113%

Moreover, as the partition (or sub-partition) size decreases, the overhead increases. The worst case occurs when each 8×8 partition is sub-divided into 4×4 sub-partitions (resulting in 406% of overhead). Table 1, below, shows the overhead required for all partitions and sub-partitions of the ITU H.264 standard.

TABLE 1

| Partition or Sub-Partition Size | Reference Frame Area fetched for quarter-pixel motion compensation | Overhead % |
| --- | --- | --- |
| 16 × 16 | (16 + 5) × (16 + 5) | 72% |
| 16 × 8 | (16 + 5) × (8 + 5) | 113% |
| 8 × 16 | (8 + 5) × (16 + 5) | 113% |
| 8 × 8 | (8 + 5) × (8 + 5) | 164% |
| 8 × 4 | (8 + 5) × (4 + 5) | 265% |
| 4 × 8 | (4 + 5) × (8 + 5) | 265% |
| 4 × 4 | (4 + 5) × (4 + 5) | 406% |

Due to the excessive overhead and other reasons, this disclosure proposes several different memory fetching modes that may be implemented by motion compensator 34 in different scenarios of the motion compensation decoding process. The most efficient mode may differ in different cases due to the different types of partitions and sub-partitions that may be used at any given time. By defining several fetching modes, and selecting the appropriate mode for a given scenario, motion compensator 34 may improve the decoding process. For example, motion compensator 34 may select a particular memory fetch mode from a plurality of possible modes on a case-by-case basis for the memory fetches associated with motion compensation decoding of a macroblock. As noted, the techniques described herein may be particularly useful when fractional interpolation to sub-integer pixels are used in the inter-frame compression, as this can add significant amounts of data that need to be fetched during motion compensation.

Figure 4:
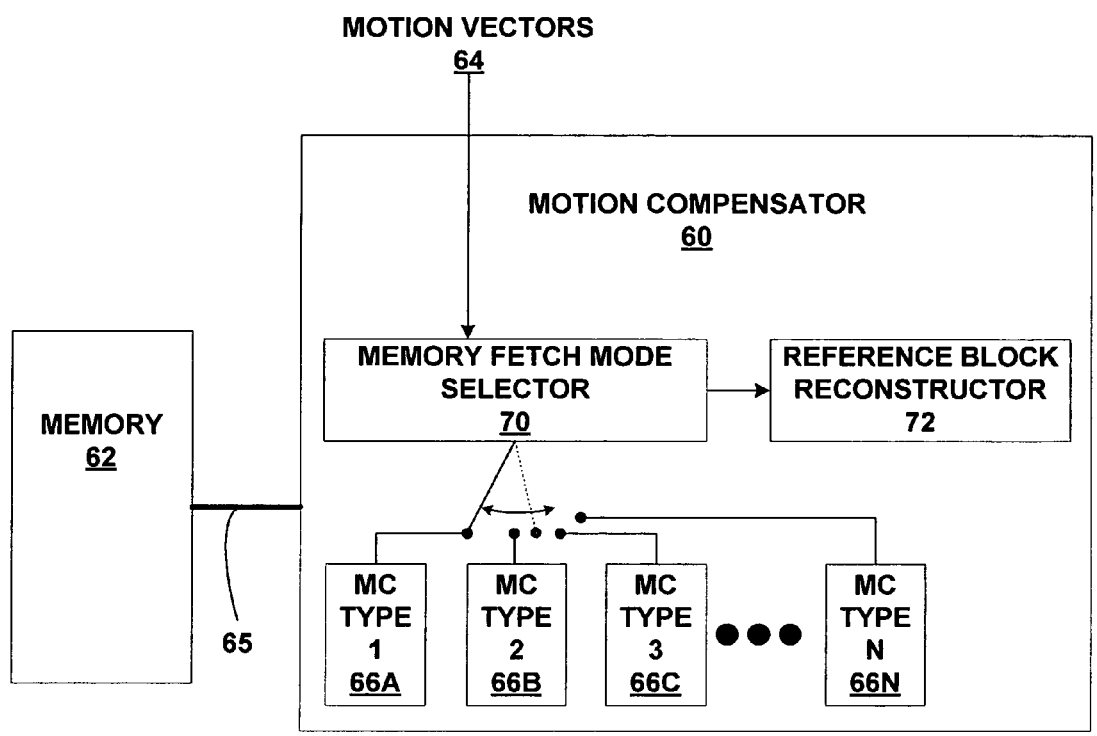
FIG. 4 is a block diagram illustrating an exemplary motion compensator according to this disclosure.

FIG. 4 is a block diagram illustrating an exemplary motion compensator 60 according to this disclosure. Motion compensator 60 and memory 62 illustrated in FIG. 4 may correspond to motion compensator 34 and memory 20 of FIG. 1, or may be implemented within a different decoder architecture.

Motion compensator 60 receives motion vectors 64 and uses motion vectors 64 to fetch the corresponding blocks of pixel data from memory 62. Motion compensator 60 and memory 8 may be coupled via a memory bus 65 or other type of data transfer interface.

In the illustrated example of FIG. 4, motion compensator 60 supports at least three different memory fetch modes for motion compensation, MC Type 1 (66A), MC Type 2 (66B) and MC Type 3 (66C). Additional modes could also be defined, as generally shown by the presence of MC Type N (66N). Indeed, an MC Type 4 mode is also contemplated, which combines the benefits of MC Type 1 and MC Type 3 for cases where, at the sub-partition level, MC Type 1 may work better for some of the sub-partitions and MC type 3 may work better for other sub-partitions. Additional discussion of this MC type 4 mode is discussed later.

In any case, as shown in FIG. 4, memory fetch mode selector 70 may determine which mode is best for a given scenario and can select the appropriate mode using switch 68. In other words, motion compensator 60 receives motion vectors 64 for a macroblock of video data, selects a memory fetch mode from a plurality of possible modes (66A-66N) for memory fetches associated with a motion compensation decoding process of the macroblock, and fetches data according to the selected memory fetch mode. The fetched data includes pixel values identified by the motion vectors 64 and additional pixel values needed for fractional interpolation.

Motion compensator 60 may also include a reference block reconstructor 72, which reconstructs the appropriate reference block from the fetched data. For integer pixel values, reference block reconstructor 72 may simply identify the appropriate pixels for the reference block. For fractional pixel values, however, reference block reconstructor 72 may implement appropriate filters for half-pixel or quarter pixel interpolation, e.g., according to a video coding standard. Also, for some modes in which a large area is fetched encompassing multiple partitions or sub-partitions (discussed below), reconstructor 72 may handle the identification of the appropriate pixels of a reference block from a fetched area that is much larger than the reference block being constructed.

Memory 62 may comprise any type of volatile or non-volatile memory technology, such as dynamic random access memory (DRAM), synchronous dynamic random access memory (SDRAM) or FLASH memory. Memory could also be implemented as electrically erasable programmable read only memory (EEPROM) or another non-volatile or volatile memory type.

The different fetch modes of MC Type 1 (66A), MC Type 2 (66B) and MC Type 3 (66C) may fetch data differently. In one example, MC Type 1 (66A) causes separate fetches for each partition and sub-partition of the macroblock, MC Type 2 (66B) causes fetching of an area encompassing each partition and sub-partition of the macroblock, and MC Type 3 (66C) causes fetching for each partition using partition areas that encompass one or more sub-partitions of each respective partition. Additional details and illustrations of MC Type 1 (66A), MC Type 2 (66B) and MC Type 3 (66C) are provided below.

Figure 5:
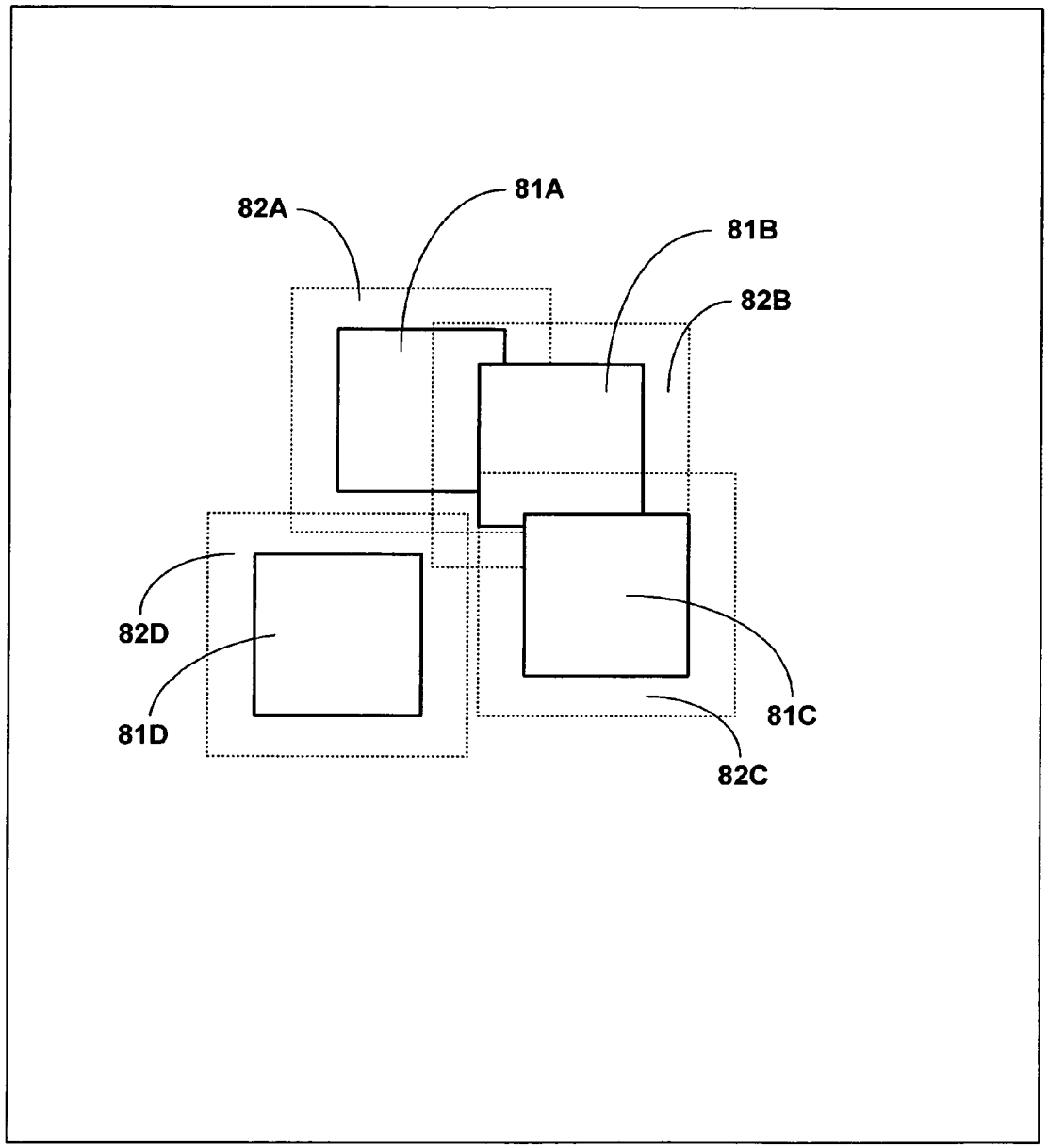
FIGS. 5-9 are different conceptual diagrams illustrating memory fetching techniques according to different embodiments of this disclosure.
Figure 6:
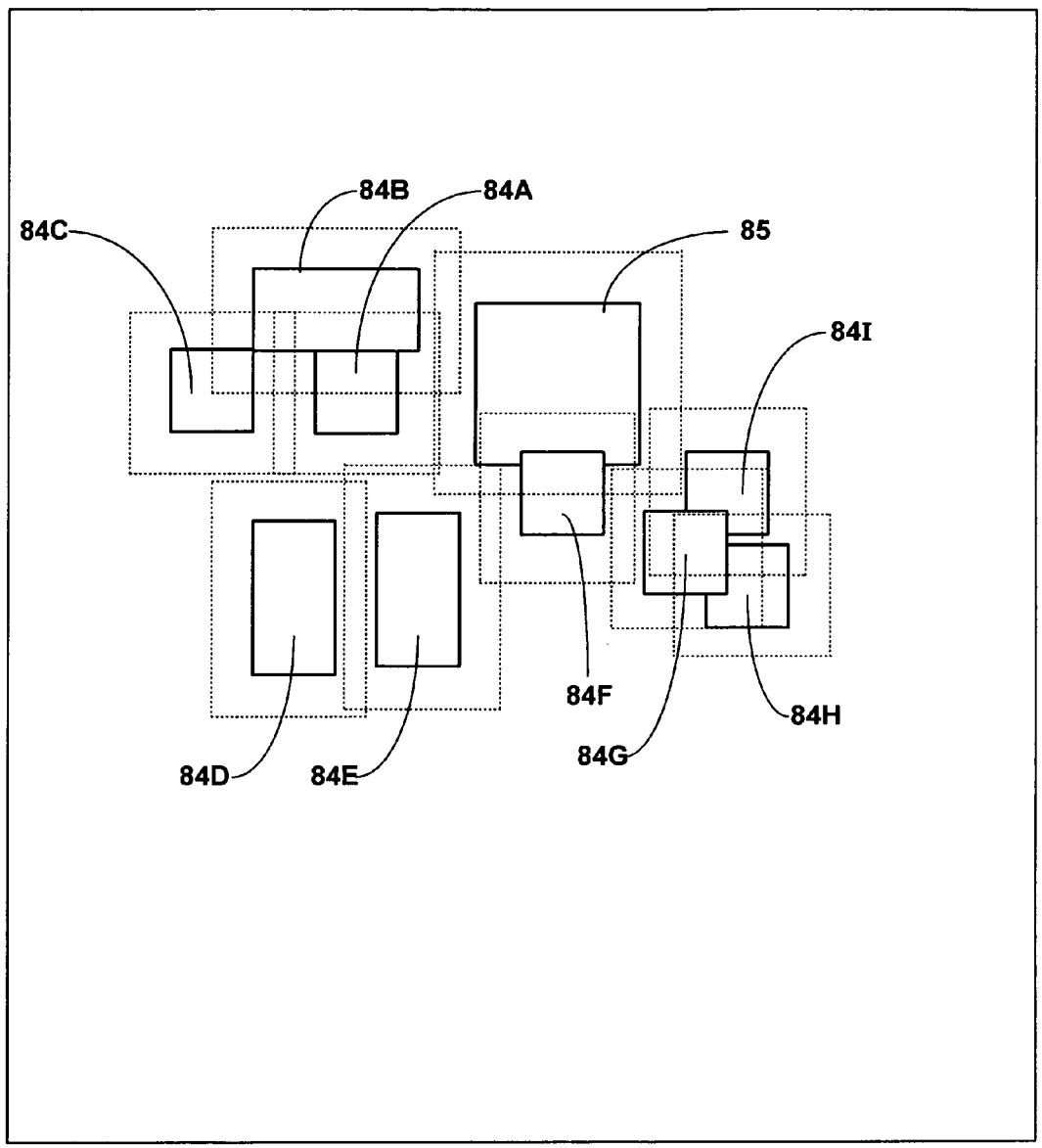

In MC Type 1 (66A), each partition or sub-partition may be fetched separately for the motion compensation decoding process. FIGS. 5 and 6 are a conceptual illustrations of fetching according to MC Type 1 (66A). As shown in FIG. 5, four different partitions 81A-81D are defined for a macroblock. In fetching each of the different partitions 81A-81D, additional pixels 82A-82D adjacent the different partitions are also fetched to facilitate fractional interpolation.

FIG. 6 illustrates a similar MC Type 1 (66A) fetching technique, in this case, performed on a sub-partition level. In this case, a macroblock is broken into partition 85 and several sub-partitions 84A-84I. The different relative motion of the partitions and sub-partitions results in substantial overlap between the different areas that are fetched according to MC Type 1 (66A). This overlap may result in inefficiency, since some of the same data is fetched several times for the different partitions and sub-partitions. Moreover, the small block sizes of the sub-partitions may be inefficient to fetch separately, due to the small amount of data fetched given memory fetch command. Generally, larger video blocks may be fetched with less bandwidth than a commensurate amount of pixels in smaller video blocks since one larger video block may be fetched via one string or burst of commands, in contrast to many smaller blocks, which would require separate discrete commands for each block. FIG. 6 also shows the added areas (labeled as dotted lines), which are formed around each of the partition 85 and sub-partitions 84A-84I. These additional areas around the partition 85 and sub-partitions 84A-84I may be needed for fractional interpolation. These addition areas not only add to the amount of data needed to be fetched, but also cause more overlap between the different fetches.

Figure 7:
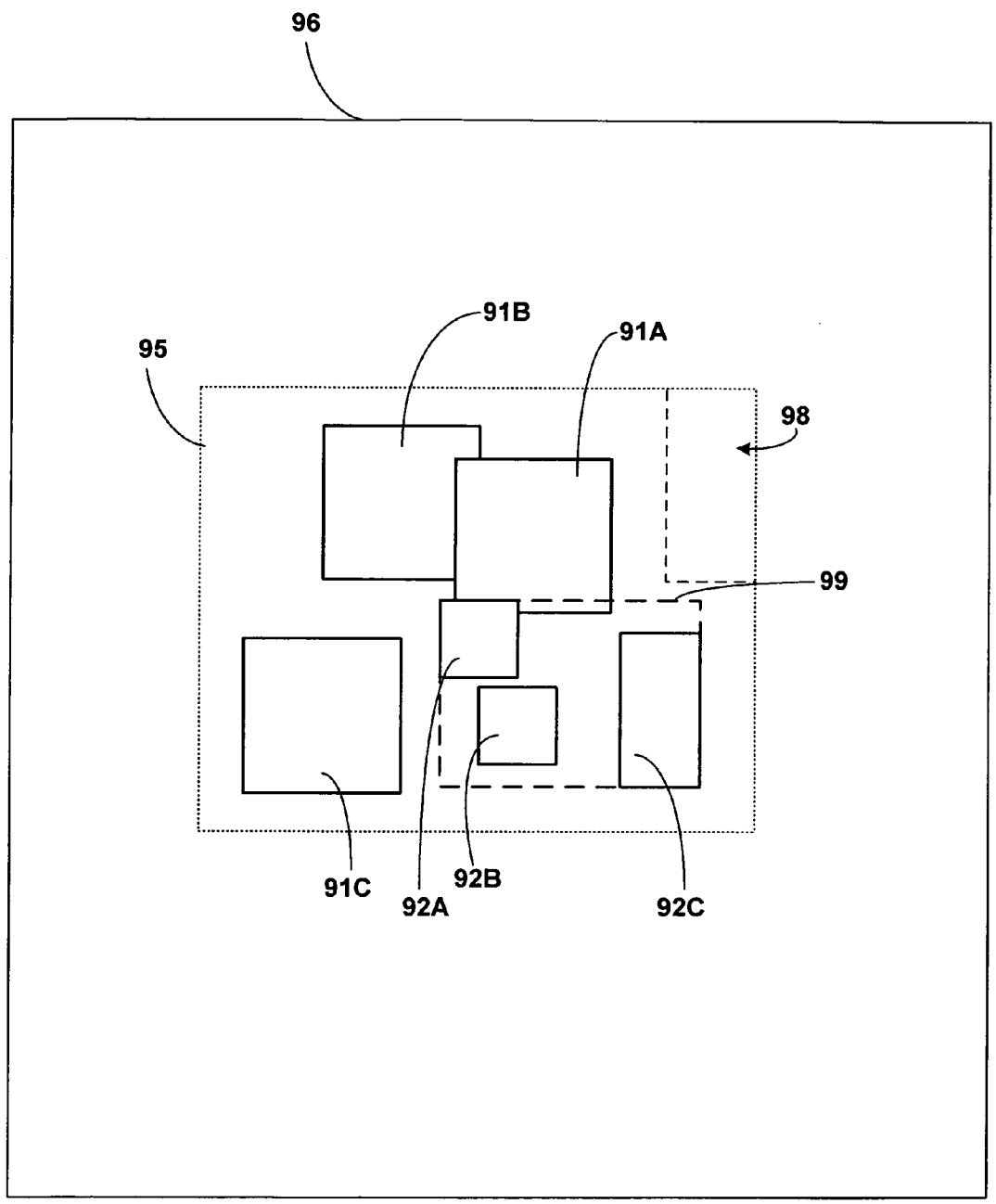

In MC Type 2 (66B), a relatively large bounding area is defined, which includes each partition and sub-partition of the macroblock. FIG. 7 is a conceptual illustration of fetching according to MC Type 2 (66B). As shown in FIG. 7, three different partitions 91A-91C and three different sub-partitions 92A-92C are defined for a macroblock. In this case, rather than fetch the requested pixels for each partition and sub-partition in separate fetch commands, a large bounding area 95 is defined about the partitions 91A-91C and three different sub-partitions 92A-92C within a respective search space 96, which is typically a previous frame that was decoded. The motion vectors may comprise one or more motion vectors for different partitions 91A-91C of the macroblock, and may also comprise one or more motion vectors for different sub-partitions of an area 99, which itself may be viewed as a partition (i.e., a partition that includes sub-partitions).

In this example, bounding area 95 is rectangular and includes all of the different partitions 91A-91C and sub-partitions 92A-92C. In addition, bounding area 95 includes various additional pixel values (e.g., in areas surrounding the partitions 91A-91C and sub-partitions 92A-92C), which are needed for fractional interpolation. According to MC Type 2 (66B), however, some pixel values (e.g., in region 98) are not within the partitions 91A-91C or sub-partitions 92A-92C and are not needed for the fractional interpolation. This is due to the rectangular nature of bounding area 95, which adds simplicity to memory fetches. Non-rectangular bounding areas might also be defined to exclude pixels that are not needed, but non-rectangular areas can add unwanted complexity to the memory fetches. Therefore, non-rectangular bounding areas may be less desirable, and fetching the extra pixel values (e.g., in region 98) that are not needed for the fractional interpolation may allow for added simplicity insofar as bursts of memory fetch commands can be used.

By way of example, partitions 91A-91C may comprise 8 by 8 pixel partitions of the macroblock. Sub-partitions 92A and 94B may comprise 4 by 4 pixel sub-partitions and sub-partition 92C. Region 99 encompassing all of sub-partitions 92A-94C may itself be viewed as one partition, i.e., a partition that includes the sub-partitions.

MC Type 2 (66B) may provide advantages over MC Type 1 (66A) in some, but not all, cases. One advantage is the avoidance of multiple fetches of the same pixels. Some of the pixels needed for fractional interpolation of partition 91A would overlap with pixels needed for fractional interpolation of sub-partition 92B. With MC Type 2 (66B), however, these pixels are fetched only once as part of bounding area 95, but used for motion compensation decoding for both partition 91A and sub-partition 92B.

Another potential advantage of MC Type 2 is the fact that bounding area 95 is itself one large block of adjacent pixels. For this reason, fetching bounding area 95 can be simplified relative to a situation in which some non-adjacent pixels are needed. The rectangular nature of bounding area 95 and the fact that all of the pixels within the bounding area 95 are fetched adds simplicity to memory fetches. In this case, the number of memory words needed to execute a complete fetch of bounding area 95 can be reduced relative to the number of words that might be needed to fetch a commensurate amount of data that was not bound within a common area. The actual number of memory words needed to execute such fetches would depend on several factors, including the amount of data to be fetched, the size and shape of bounding area 95 (rectangular being an efficient shape), and the width of the memory bus, i.e., the width of bus 65 (FIG. 4).

On the other hand, in some cases, MC Type 2 (66B) could actually be less efficient or more complex than MC Type 1 (66A). This is generally due to the fact that according to MC Type 2 (66B), some pixel values (e.g., in region 98) are not within the partitions 91A-91C or sub-partitions 92A-92C and are not needed for the fractional interpolation. The fetching of such data is extraneous, yet included because, in most cases, the added simplicity of a rectangular bounding area 95 outweighs the added costs or complexity needed to exclude the extraneous data. However, in some cases, if the partitions 91A-91C and sub-partitions 92A-92C exhibit motion that moves them away from one another, substantial amounts of this extraneous data could be present in bounding area 95.

Figure 8:
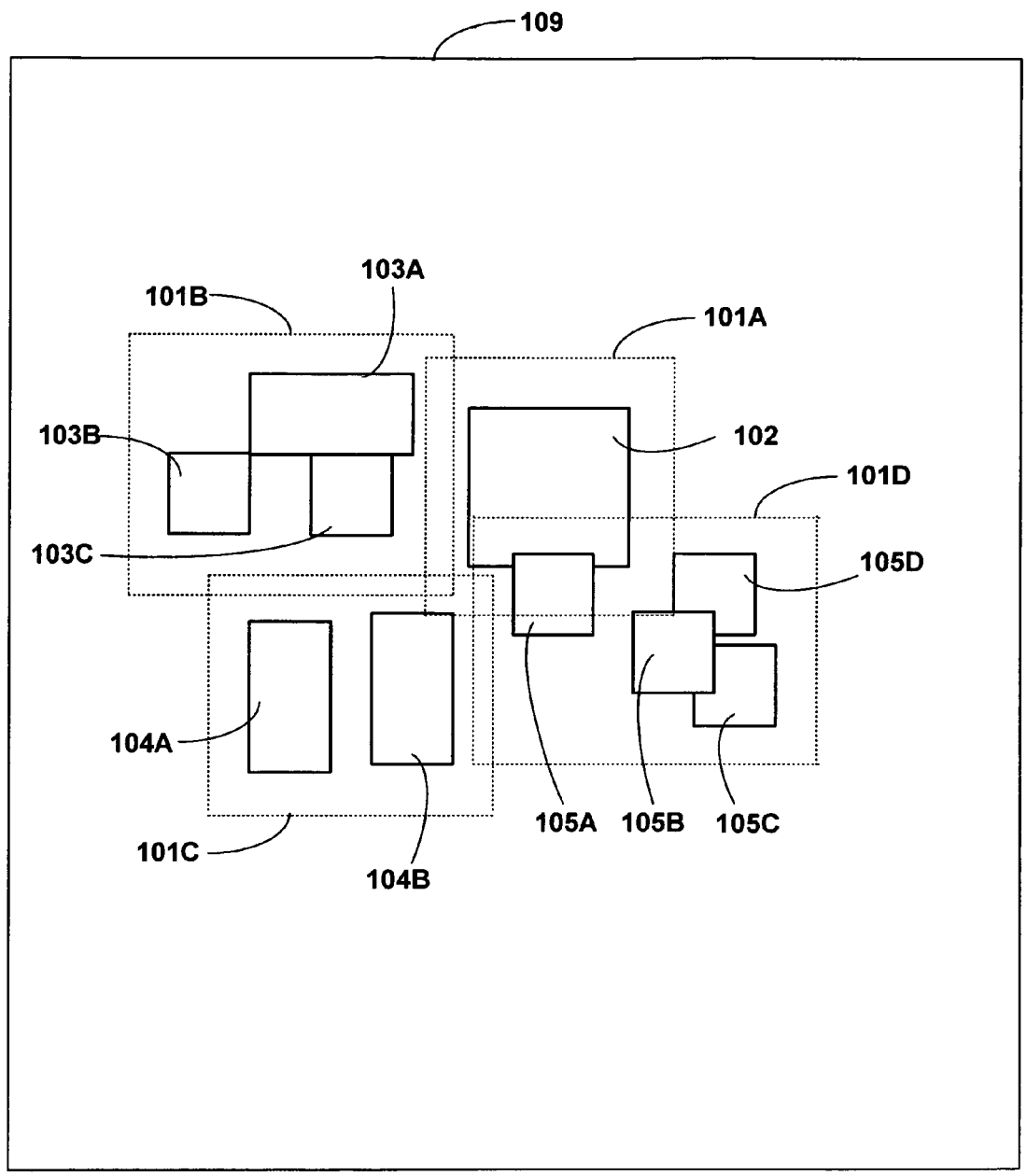
Figure 9:
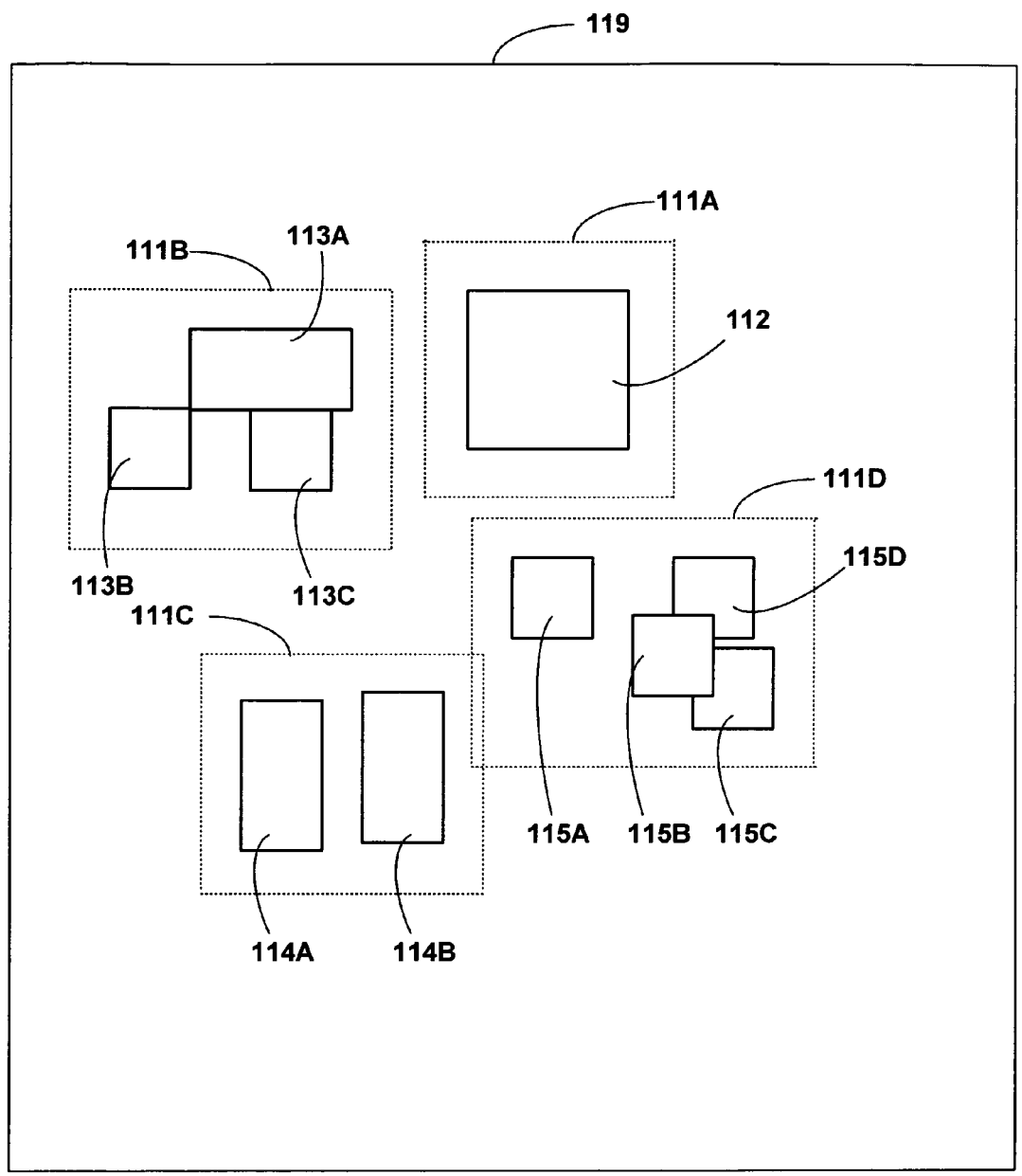

In MC Type 3 (66C), fetching is performed for each partition using partition areas that encompass one or more sub-partitions of each respective partition. In this way, MC Type 3 (66C) is somewhat similar to MC Type 2 (66B) in that bounding areas are used about sets of video blocks, but different in that several bounding areas are defined at the partition level around the respective sub-partitions. FIGS. 8 and 9 are conceptual illustrations of fetching according to MC Type 3 (66C). As shown in FIG. 8, four different bounding areas 101A-101D are defined at the partition level within a search space 109, which may be a prior decoded frame of a video sequence. In other words, each partition (whether it is the only sub-partition or a set of smaller sub-partitions) includes its own partition bounding area.

Partition bounding area 101A includes partition 102 and additional pixels needed for fractional interpolation of partition 102. Partition 102 may comprise an 8 by 8 block, and therefore, may itself be viewed as a sub-partition (see FIG. 2). Partition bounding area 101B includes three sub-partitions 103A-103C, any pixels needed for fractional interpolation of sub-partitions 103A-103C, and possibly some extra pixels due to the rectangular nature of bounding area 101B and relative motion of the sub-partitions 103A-103C. Similarly, partition bounding area 101C includes two sub-partitions 104A and 104B, the pixels needed for fractional interpolation of sub-partitions 103A-103C, and possibly some extra pixels due to the rectangular nature of bounding area 101C and relative motion of the sub-partitions 104A-104B. Like bounding areas 101B and 101C, partition bounding area 101D includes sub-partitions (in this case four sub-partitions 105A-105D), the pixels needed for fractional interpolation of sub-partitions 105A-105D, and possibly some extra pixels due to the rectangular nature of bounding area 101D and relative motion of the sub-partitions 105A-105D.

FIG. 9 is similar to FIG. 8 but has different relative motion of the respective partitions (some of which include sub-partitions). In FIG. 9, four different bounding areas 111A-111D are defined at the partition level. In other words, each partition (whether its is only a partition or a set of sub-partitions) includes its own partition bounding area.

Partition bounding area 111A includes partition 112 and additional pixels needed for fractional interpolation of partition. Partition bounding area 111B includes three sub-partitions 113A-113C, any pixels needed for fractional interpolation of sub-partitions 113A-113C, and extra pixels due to the rectangular nature of bounding area 111B and relative motion of the sub-partitions 113A-113C. Partition bounding area 111C includes two sub-partitions 114A and 114B, the pixels needed for fractional interpolation of sub-partitions 113A-113C, and extra pixels due to the rectangular nature of bounding area 111C and relative motion of the sub-partitions 114A-114B. Like bounding areas 111B and 111C, partition bounding area 111D includes sub-partitions (in this case four sub-partitions 115A-115D), the pixels needed for fractional interpolation of sub-partitions 115A-115D, and extra pixels due to the rectangular nature of bounding area 111D and relative motion of the sub-partitions 115A-115D.

In FIG. 8, the different bounding areas have overlap, in which case some of the same pixels will be fetched as part of the different bounding areas. In FIG. 9, however, such overlap is minimized due to different relative motion at the partition level. For this reason, the scenario of FIG. 9 is more likely to use MC Type 3 (66C) than the scenario of FIG. 8.

Relative to MC Type 1 (66A) and MC Type 2 (66B), MC Type 3 (66C) may be more efficient and/or better suited for some situations. The scenario of FIG. 9 is a very likely candidate scenario where MC Type 3 (66C) would be used. Many of the same advantages associated with MC Type 2 (66B) relative to MC Type 1 (66A) may also apply for MC Type 3 (66C) relative to MC Type 1 (66A). MC Type 3 has the disadvantage relative to MC Type 2 (66B) of requiring four instead of one bounding area, and also has the potential for overlap between such bounding areas, which may result in the inefficient fetching of the same pixels multiple times. On the other hand, MC Type 3 (66C) has the potential for efficiency relative to MC Type 2 (66B), particularly for scenarios similar to that shown in FIG. 9.

Referring to FIG. 9, according to MC Type 3 (66C), motion vectors may be received for several different sub-partitions 113A-113C, 114A and 114B, and 115A-115D of a macroblock. Data is then fetched by defining a plurality of partition areas (such as 111B, 111C and 11D) around different subsets of the sub-partitions within a search space 119. For example, sub-partitions 113A-113C may comprise one subset, sub-partitions 114A and 114B may comprise another subset, and sub-partitions 115A-115D may comprise another subset. Each subset is defined at the partition level. In this case, the data of partition 112 is not broken into sub-partition level, e.g., due to less resolution in that area of the macroblock. In this case, partition area 111A is defined about partition 112. Thus, partition area 111A can also be viewed as defining about its own subset of sub-partitions insofar as partition 112 may be viewed as a partition or sub-partition at the 8 by 8 pixel resolution (see FIG. 2). In any case, each of the partition areas encompasses one of the subsets of the sub-partitions and additional pixel values adjacent the different sub-partitions needed for the fractional interpolation. Motion compensator 60 can then fetch the plurality of partition areas from memory 62 for the motion compensation decoding process of the macroblock defined by the various partitions or sub-partitions shown in FIG. 9.

Partition/sub-partition 112 may include an 8 pixel by 8 pixel block of video data (and possibly two or more blocks to convey chrominance and luminance information). Sub-partitions 113A, 113C and 115A-115D may include 4 pixel by 4 pixel blocks of video data (and possibly two or more blocks for every illustrated block to convey chrominance and luminance information). Sub-partition 113A may include an 8 pixel by 4 pixel block (and possibly two or more block to convey the chrominance and luminance information), while sub-partitions 114A and 114B may include 4 pixel by 8 pixel blocks (and possibly two or more per illustrated block to convey chrominance and luminance information).

The partition areas 111A-111D are rectangular. Furthermore, those partition areas that include sub-partitions at resolution beyond 8 by 8 pixel blocks (e.g., 111B-111D) may include some additional pixel values not within the sub-partitions and not needed for the fractional interpolation. This is due to the rectangular nature of areas 111A-111D. While the fetching of such data may be extraneous, the added simplicity of a rectangular bounding areas 111A-111D may outweigh the added costs or complexity needed to exclude the extraneous data.

Figure 10:
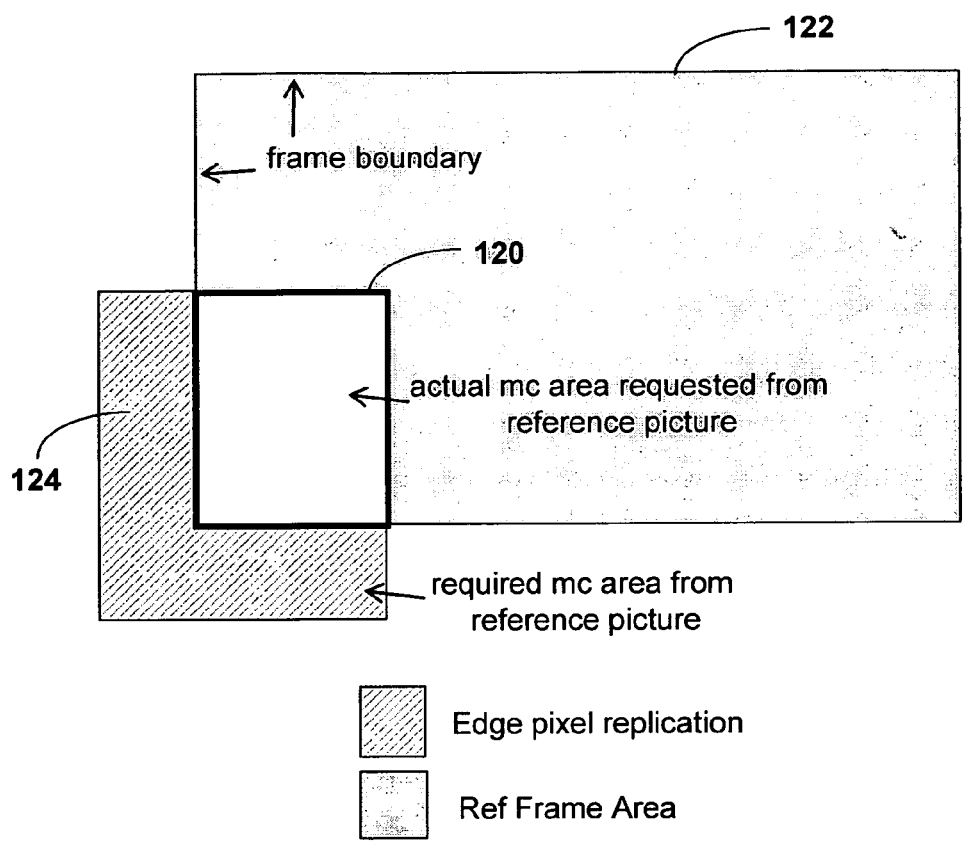
FIG. 10 is a conceptual diagram illustrating a macroblock partition or sub-partition of video data on an edge of a video frame and additional pixels that may be replicated to facilitate fractional interpolation according to this disclosure.

Regardless of the mode that is used, another issue that can arise relates to fractional interpolation at the edges of a video frame. In this case, the data needed for fractional interpolation of such edge pixels may not exist. FIG. 10 is a conceptual diagram that illustrates one relatively simple solution to this problem of edge pixel interpolation. In particular, when an area 120 requested from a reference video frame 122 includes a portion 124 that resides outside of the reference video frame 122, motion compensator 60 (or another component) may simply replicate the edge-most pixels values of the reference frame to define the pixels in portion 124. The replicated pixels can then be used to perform any fractional interpolation to half-pixel and quarter-pixel resolution.

In accordance with this disclosure, the techniques described for MC Type 1, MC Type 2 and MC Type 3 may be used alone or in combination. In the above description, the techniques are described as alternative modes that are selected, although the different modes (particularly MC Type 2 and MC Type 3) could be used alone for some decoders. When used together, the selected mode may depend on several factors, including the width of the memory bus, the size of the memory, the amount of buffer storage space in the motion compensator, the overall amount of data required to be fetched for each possible mode, the average number of memory commands required per macroblock for motion compensation purposes, the average number of bursty requests required per macroblock for motion compensation purposes. Bursty requests refer to memory commands that can be strung together for efficiency, e.g., when requested pixel values are stored in adjacent fashion. Bursty requests are more desirable than non-bursty requests, and generally occur more often in MC Types 2 and 3 relative to MC Type 1.

Figure 11:
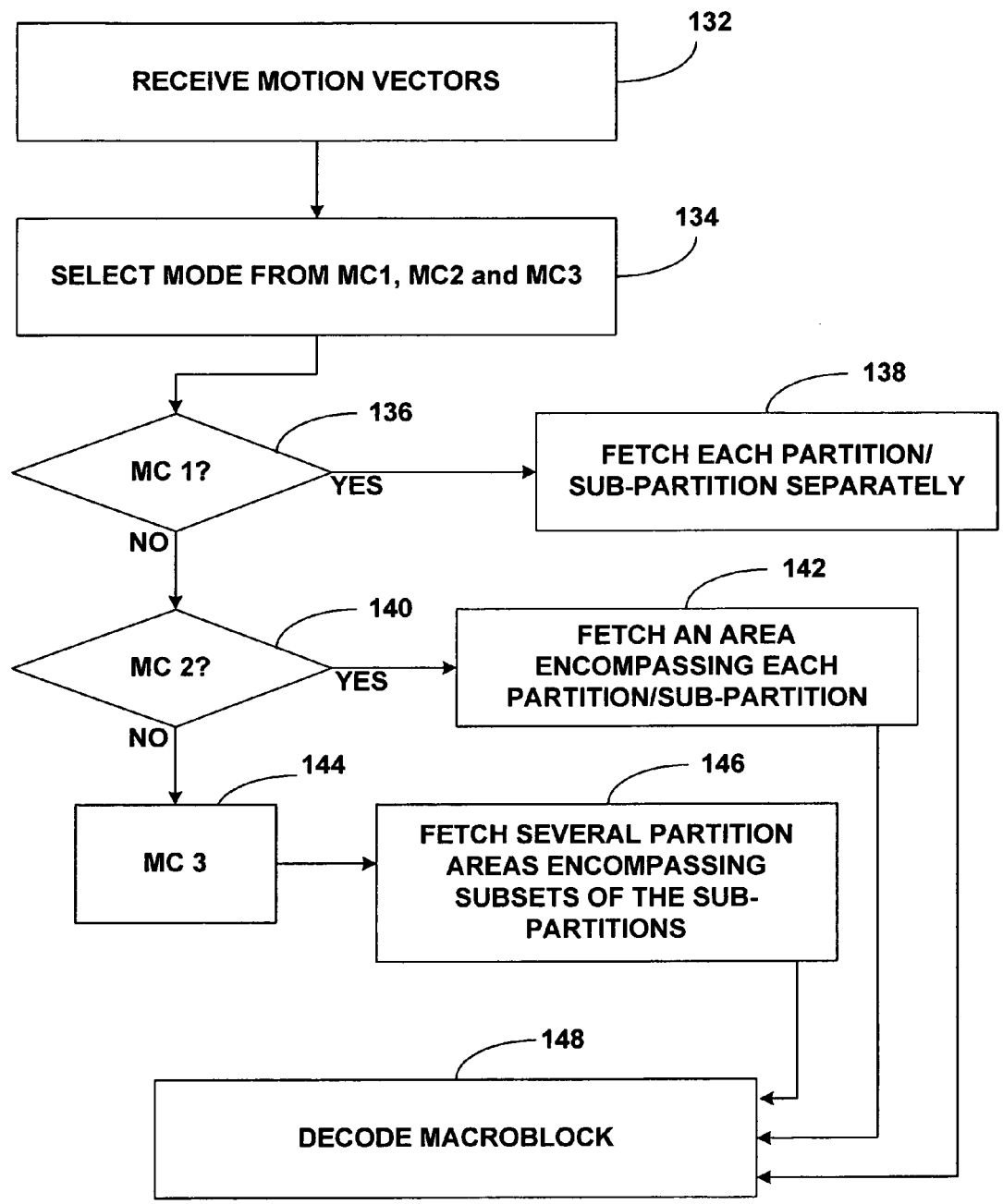
FIG. 11 is a flow diagram illustrating an exemplary fetching technique for a motion compensation decoding process according to this disclosure.

FIG. 11 is a flow diagram illustrating an exemplary fetching technique for a motion compensation decoding process according to this disclosure. As shown in FIG. 11, motion compensator 34 of decoder 10 receives motion vectors 6 associated with a macroblock (132). Using these motion vectors, motion compensator 34 selects a memory fetch mode from MC Type 1, MC Type 2 and MC Type 3 (134). In particular, motion compensator 34 may select the mode that uses the least memory bandwidth. The amount of memory bandwidth may be affected by several variables including the amount of available memory, the speed of the memory, the width of memory the memory bus, and the sizes, shapes and number of the areas to be fetched.

If MC Type 1 is selected by motion compensator 34 (yes branch of 136), each partition and sub-partition of the macroblock is fetched separately (138). The fetched data for each partition and sub-partition may include additional data needed for fractional interpolation to fractional pixel resolution, if desired. Decoder 10 then proceeds to decode the macroblock including the motion compensation process performed by motion compensator 34 using the fetched data (148).

If MC Type 2 is selected by motion compensator 34 (yes branch of 140), motion compensator 34 defines an area that encompasses every partition and sub-partition of the macroblock (142). Moreover, this area may include additional data for each partition and sub-partition needed for fractional interpolation to fractional pixel resolution, if desired. The area may be rectangular, in which case some of the fetched data may be extraneous and not used by motion compensator 34. In any case, decoder 10 then proceeds to decode the macroblock including the motion compensation process performed by motion compensator 34 using the fetched data (148).

If MC Type 3 is selected by motion compensator 34 (144), motion compensator 34 defines several areas encompassing different subsets of sub-partitions of the macroblock (146). Each subset may include all of the sub-partitions associated with a given partition of the macroblock. In other words, each of the defined areas encompasses the sub-partitions associated with each respective partition of the macroblock. Furthermore, each of the areas may include additional data for each sub-partition needed for fractional interpolation to fractional pixel resolution, if desired. The areas may be rectangular, in which case some of the fetched data may be extraneous and not used by motion compensator 34. In any case, decoder 10 then proceeds to decode the macroblock including the motion compensation process performed by motion compensator 34 using the fetched data (148).

As yet another possibility, the MC type 3 mode itself could include another mode decision at the partition level. In the foregoing discussion, each mode decision has been described as being mode decisions at the macroblock level, i.e., how to fetch the data for a macroblock. Another possibility (defined herein as MC type 4), could define a memory fetch that combines fetches according to MC type 1 with fetches according to MC type 3 for the macroblock. In order to arrive at MC type 4, it could be determined that for some of the partitions that include sub-partitions, the most efficient way to fetch is to define bounding areas around those sub-partitions, while for other partitions that include sub-partitions the most efficient way to fetch is to fetch each of the sub-partitions separately. This scenario might occur if one of the partitions includes several sub-partitions that move closer to one another, while another of the partitions includes several sub-partitions that move away from one another.

In this case, a MC type 4 mode that performs MC type 3 fetching for some of the partitions, and MC type 1 for others of the partitions might be most efficient. In other words, MC type 4 causes fetching for some of the partitions using partition areas that encompass one or more sub-partitions of each respective partition and causes separate fetches for other sub-partitions of the macroblock. In some implementations of MC type 4, the mode decisions could occur at both the macroblock and the partition level, i.e., at the macroblock level, whether to do separate searches for partitions or to define bounding areas, and at the partition level, whether to do separate searches for the sub-partitions or to define bounding areas. These and other types of modes might also be used in accordance with the techniques described herein.

A number of embodiments have been described. The techniques described herein may be implemented in hardware, software, firmware, or any combination thereof. If implemented in software, the techniques may be directed to a computer readable medium comprising instructions, that when executed in a decoder, cause the decoder perform the techniques described herein. In that case, the computer readable medium may comprise random access memory (RAM), read-only memory (ROM), non-volatile random access memory (NVRAM), electrically erasable programmable read-only memory (EEPROM), FLASH memory, or the like. The decoder may comprise any processor or computer that executes the software instructions to perform the techniques described herein.

Nevertheless, various modifications may be made to the techniques described herein. For example, the techniques MC Type 2 or MC Type 3 could be used alone to provide for motion compensation decoding with efficient memory fetching capabilities. The selection between MC Type 1, MC Type 2 and MC Type 3, however, is generally more efficient than the use of any of these modes individually. These and other embodiments are within the scope of the following claims.

The invention claimed is:

1. A method comprising:

receiving motion vectors for a macroblock of video data in a video coding device;

selecting a memory fetch mode from a plurality of modes for memory fetches associated with a motion compensation decoding process of the macroblock wherein the plurality of modes include: a first mode that causes separate fetches for each partition and sub-partition of the macroblock and for additional pixels needed for fractional interpolation of each partition and sub-partition, a second mode that causes fetching of an area encompassing each partition and sub-partition of the macroblock and encompassing additional pixels needed for fractional interpolation of the partitions and sub-partitions of the macroblock in the area, and a third mode that causes separate fetching for each partition using separate partition areas that encompass sub-partitions of each respective partition of the macroblock and encompass additional pixels needed for fractional interpolation of the sub-partitions of the macroblock in each partition area; and fetching data from a memory of the video coding device according to the selected memory fetch mode, wherein the fetched data includes pixel values identified by the motion vectors and the additional pixel values needed for fractional interpolation, wherein selecting the memory fetch mode includes selecting the first mode in first scenarios of the motion compensation decoding process, selecting the second mode in second scenarios of the motion compensation decoding process, and selecting the third mode in third scenarios of the motion compensation decoding process, and wherein, in the case that the selected mode comprises the third mode, fetching data according to the third mode comprises:

defining a plurality of partition areas around different subsets of the sub-partitions within a search space, wherein each of the partition areas encompasses one of the subsets of the sub-partitions and additional pixel values adjacent the different sub-partitions needed for the fractional interpolation; and fetching the plurality of partition areas for the motion compensation decoding process of the macroblock, wherein the motion vectors comprise motion vectors for different sub-partitions of the macroblock.

2. The method of claim 1, wherein the selected mode comprises the second mode and wherein:

the motion vectors comprise one or more motion vectors for different partitions of the macroblock; and fetching data according to the selected memory fetch mode comprises:

defining an area around the different partitions within a search space, the area encompassing each of the different partitions and additional pixel values adjacent the different partitions needed for the fractional interpolation; and fetching the defined area for the motion compensation decoding process of the macroblock.

3. The method of claim 2, wherein the partitions include 8 by 8 pixel partitions of the macroblock.

4. The method of claim 2, wherein one or more of the partitions includes sub-partitions and the motion vectors identify motion of the sub-partitions.

5. The method of claim 2, wherein the defined area is rectangular and includes all of the different partitions, the additional pixel values needed for fractional interpolation, and some pixel values not within the partitions and not needed for the fractional interpolation.

6. The method of claim 1, wherein the sub-partitions include one or more 4 by 4 pixel sub-partitions of the macroblock.

7. The method of claim 1, wherein each of the partition areas are rectangular and include some additional pixel values not within the sub-partitions and not needed for the fractional interpolation.

8. The method of claim 1, wherein each of the partition areas include sub-partitions associated with a respective partition of the macroblock.

9. The method of claim 1, further comprising replicating edge pixel values of a reference video frame to define some of the pixel values needed for fractional interpolation that reside outside of the reference video frame.

10. The method of claim 1, further comprising decoding the macroblock using the fetched data.

11. The method of claim 1, wherein the macroblock comprises one or more blocks of chrominance values and one or more blocks of luminance values.

12. The method of claim 1, wherein the plurality of modes include:

a fourth mode that causes fetching for some of the partitions using partition areas that encompass one or more sub-partitions of each respective partition and causes separate fetches for other sub-partitions of the macroblock.

13. A device comprising:

a memory that stores pixel data; and a motion compensator that receives motion vectors for a macroblock of video data, selects a memory fetch mode from a plurality of modes for memory fetches associated with a motion compensation decoding process of the macroblock wherein the plurality of modes include: a first mode that causes separate fetches for each partition and sub-partition of the macroblock and for additional pixels needed for fractional interpolation of each partition and sub-partition, a second mode that causes fetching of an area encompassing each partition and sub-partition of the macroblock and encompassing additional pixels needed for fractional interpolation of the partitions and sub-partitions of the macroblock in the area, and a third mode that causes separate fetching for each partition using separate partition areas that encompass sub-partitions of each respective partition of the macroblock and encompass additional pixels needed for fractional interpolation of the sub-partitions of the macroblock in each partition area, and fetches data from the memory according to the selected memory fetch mode, wherein the fetched data includes pixel values identified by the motion vectors and additional pixel values needed for fractional interpolation, wherein the motion compensator selects the first mode in first scenarios, selects the second mode in second scenarios of the motion compensation decoding process, and selects the third mode in third scenarios of the motion compensation decoding process, and wherein, in the case that the selected mode comprises the third mode, the motion compensator is further configured to:

receive motion vectors for different sub-partitions of the macroblock; and fetch the data from the memory according to the selected memory fetch mode by defining a plurality of partition areas around different subsets of the sub-partitions within a search space, wherein each of the partition areas encompasses one of the subsets of the sub-partitions and additional pixel values adjacent the different sub-partitions needed for the fractional interpolation, and fetch the plurality of partition areas for the motion compensation decoding process of the macroblock.

14. The device of claim 13, wherein the selected mode comprises the second mode and wherein the motion compensator:

receives one or more motion vectors for different partitions of the macroblock; and fetches the data from the memory according to the selected memory fetch mode by defining an area about the different partitions within a search space, the area encompassing each of the different partitions and additional pixel values adjacent the different partitions needed for the fractional interpolation, and fetching the area for the motion compensation decoding process of the macroblock.

15. The device of claim 14, wherein one or more of the partitions include sub-partitions and the motion vectors identify motion of the sub-partitions.

16. The device of claim 14, wherein the area is rectangular and includes all of the different partitions, the additional pixel values needed for fractional interpolation, and some pixel values not within the partitions and not needed for the fractional interpolation.

17. The device of claim 13, wherein each of the partition areas are rectangular and include some additional pixel values not within the sub-partitions and not needed for the fractional interpolation.

18. The device of claim 13, wherein each of the partition areas include sub-partitions associated with a respective partition of the macroblock.

19. The device of claim 13, wherein the motion compensator replicates edge pixel values of a reference video frame to define some of the pixel values needed for fractional interpolation that reside outside of the reference video frame when a particular area to be fetched includes at least a portion that resides outside of the reference video frame.

20. The device of claim 13, wherein the motion compensator decodes the macroblock using the fetched data.

21. The device of claim 13, wherein the macroblock comprises one or more blocks of chrominance values and one or more blocks of luminance values.

22. The device of claim 13, wherein the plurality of modes include:
a fourth mode that causes fetching for some of the partitions using partition areas that encompass one or more sub-partitions of each respective partition and causes separate fetches for other sub-partitions of the macroblock.

23. A decoder comprising a processor that:
receives motion vectors for a macroblock of video data;
selects a memory fetch mode from a plurality of modes for memory fetches associated with a motion compensation decoding process of the macroblock, wherein the plurality of modes include: a first mode that causes separate fetches for each partition and sub-partition of the macroblock and for additional pixels needed for fractional interpolation of each partition and sub-partition, a second mode that causes fetching of an area encompassing each partition and sub-partition of the macroblock and encompassing additional pixels needed for fractional interpolation of the partitions and sub-partitions of the macroblock in the area, and a third mode that causes separate fetching for each partition using separate partition areas that encompass sub-partitions of each respective partition of the macroblock and encompass additional pixels needed for fractional interpolation of the sub-partitions of the macroblock in each partition area; and
fetches data from a memory according to the selected memory fetch mode, wherein the data includes pixel values identified by the motion vectors and additional pixel values needed for fractional interpolation,
wherein the processor selects the first mode in first scenarios, selects the second mode in second scenarios of the motion compensation decoding process, and selects the third mode in third scenarios of the motion compensation decoding process,
wherein, in the case that the selected mode comprises the third mode, the processor is further configured to:
receive motion vectors for different sub-partitions of the macroblock; and
fetch the data from the memory according to the selected memory fetch mode by defining a plurality of partition areas around different subsets of the sub-partitions within a search space, wherein each of the partition areas encompasses one of the subsets of the sub-partitions and additional pixel values adjacent the different sub-partitions needed for the fractional interpolation, and fetch the plurality of partition areas for the motion compensation decoding process of the macroblock.

24. The decoder of claim 23, wherein the selected mode comprises the second mode and wherein the processor:
receives one or more motion vectors for different partitions of the macroblock; and
fetches the data from the memory according to the selected memory fetch mode by defining an area about the different partitions within a search space, the area encompassing each of the different partitions and additional pixel values adjacent the different partitions needed for the fractional interpolation, and fetching the area for the motion compensation decoding process of the macroblock.

25. The decoder of claim 23, wherein the plurality of modes include a fourth mode that causes fetching for some of the partitions using partition areas that encompass one or more sub-partitions of each respective partition and causes separate fetches for other sub-partitions of the macroblock.

26. The decoder of claim 23, wherein the decoder performs a motion compensation decoding process using the fetched data.

27. A non-transitory computer-readable medium comprising executable instructions that when executed cause a decoder to:
receive motion vectors for a macroblock of video data;
select a memory fetch mode from a plurality of modes for memory fetches associated with a motion compensation decoding process of the macroblock wherein the plurality of modes include: a first mode that causes separate fetches for each partition and sub-partition of the macroblock and for additional pixels needed for fractional interpolation of each partition and sub-partition, a second mode that causes fetching of an area encompassing each partition and sub-partition of the macroblock and encompassing additional pixels needed for fractional interpolation of the partitions and sub-partitions of the macroblock in the area, and a third mode that causes separate fetching for each partition using separate partition areas that encompass sub-partitions of each respective partition of the macroblock and encompass additional pixels needed for fractional interpolation of the sub-partitions of the macroblock in each partition area; and
fetch data according to the selected memory fetch mode, wherein the data includes pixel values identified by the motion vectors and additional pixel values needed for fractional interpolation,
wherein the instructions cause the decoder to select the first mode in first scenarios, select the second mode in second scenarios of the motion compensation decoding process, and select the third mode in third scenarios of the motion compensation decoding process,
wherein, in the case that the selected mode comprises the third mode, the instructions when executed cause the decoder to:
receive motion vectors for different sub-partitions of the macroblock; and
fetch data according to the selected memory fetch mode by defining a plurality of partition areas around different subsets of the sub-partitions within a search space, wherein each of the partition areas encompasses one of the subsets of the sub-partitions and additional pixel values adjacent the different sub-partitions needed for the fractional interpolation, and fetch the plurality of partition areas for the motion compensation decoding process of the macroblock.

28. The non-transitory computer-readable medium of claim 27, wherein the selected mode comprises the second mode and wherein the instructions when executed cause the decoder to:
receive one or more motion vectors for different partitions of the macroblock; and fetch data according to the selected memory fetch mode by defining an area about the different partitions within a search space, the area encompassing each of the different partitions and additional pixel values adjacent the different partitions needed for the fractional interpolation, and fetching the area for the motion compensation decoding process of the macroblock.

29. The non-transitory computer-readable medium of claim 27, wherein the plurality of modes include a fourth mode that causes fetching for some of the partitions using partition areas that encompass one or more sub-partitions of each respective partition and causes separate fetches for other sub-partitions of the macroblock.

30. A device comprising:
   means for receiving motion vectors for a macroblock of video data;
   means for selecting a memory fetch mode from a plurality of modes for memory fetches associated with a motion compensation decoding process of the macroblock wherein the plurality of modes include: a first mode that causes separate fetches for each partition and sub-partition of the macroblock and for additional pixels needed for fractional interpolation of each partition and sub-partition, a second mode that causes fetching of an area encompassing each partition and sub-partition of the macroblock and encompassing additional pixels needed for fractional interpolation of the partitions and sub-partitions of the macroblock in the area, and a third mode that causes separate fetching for each partition using separate partition areas that encompass sub-partitions of each respective partition of the macroblock and encompass additional pixels needed for fractional interpolation of the sub-partitions of the macroblock in the partition area; and
   means for fetching data according to the selected memory fetch mode, wherein the data includes pixel values identified by the motion vectors and additional pixel values needed for fractional interpolation,
   wherein the means for selecting selects the first mode in first scenarios, selects the second mode in second scenarios of the motion compensation decoding process, and selects the third mode in third scenarios of the motion compensation decoding process,
   wherein, in the case that the selected mode comprises the third mode, the means for receiving receives motion vectors for different sub-partitions of the macroblock, and
   the means for fetching defines a plurality of partition areas around different subsets of the sub-partitions within a search space, wherein each of the partition areas encompasses one of the subsets of the sub-partitions and additional pixel values adjacent the different sub-partitions needed for the fractional interpolation, and fetches the plurality of partition areas for the motion compensation decoding process of the macroblock.

31. The device of claim 30, wherein the selected mode comprises the second mode and wherein:
   the means for receiving receives one or more motion vectors for different partitions of the macroblock; and
   the means for fetching defines an area about the different partitions within a search space, the area encompassing each of the different partitions and additional pixel values adjacent the different partitions needed for the fractional interpolation, and fetches the area for the motion compensation decoding process of the macroblock.

32. The device of claim 30, wherein the plurality of modes include a fourth mode that causes fetching for some of the partitions using partition areas that encompass one or more sub-partitions of each respective partition and causes separate fetches for other sub-partitions of the macroblock.

* * * * *